United States Patent [19]
Wada et al.

[11] 3,738,681
[45] June 12, 1973

[54] DEVICE FOR REGULATING PRESSURE IN THE INSIDE OF A CAR

[75] Inventors: Akihiro Wada, Aichi; Yuichi Sorimachi, Toyota, both of Japan

[73] Assignee: Toyota Jidosha Kogyo Kabushiki Kaisha, Toyota, Aichi-ken, Japan

[22] Filed: July 9, 1971

[21] Appl. No.: 161,217

[30] Foreign Application Priority Data
Oct. 14, 1970 Japan.............................. 45/90203

[52] U.S. Cl............ 280/150 AB, 49/141, 180/112, 292/DIG. 65
[51] Int. Cl. ........................................... B60r 21/08
[58] Field of Search ........................180/112, 113; 296/76; 292/DIG. 65, 201; 137/525, 525.3; 78/2.18; 280/150 AB; 49/141

[56] References Cited
UNITED STATES PATENTS

| | | | |
|---|---|---|---|
| 2,297,892 | 10/1942 | Jacobs | 137/529 |
| 2,469,159 | 5/1949 | Dombrowiak | 292/DIG. 65 |
| 2,631,518 | 3/1953 | Brandenburg | 98/2.18 X |
| 2,714,521 | 8/1955 | Graham | 292/DIG. 65 |
| 3,151,698 | 10/1964 | Pollock | 180/113 |
| 3,236,169 | 2/1966 | Starnaman | 98/2.18 |
| 3,432,997 | 3/1969 | Downey et al. | 137/525.1 |
| 3,525,296 | 8/1970 | Haapanen | 98/2.18 |
| 3,572,065 | 3/1971 | Peters | 292/201 |
| 3,624,810 | 11/1971 | Hass | 280/150 AB |
| 3,638,552 | 2/1972 | Dettloff | 98/2.18 |

Primary Examiner—Kenneth H. Betts
Assistant Examiner—David M. Mitchell
Attorney—Stevens, Davis, Miller & Mosher

[57] ABSTRACT

A device for regulating pressure in the inside of a car comprising means for unlocking the door of the trunk of the car upon receipt of a signal from collision sensing means or collision predicting means, and communication means for establishing communication between the inside of the car and the trunk.

3 Claims, 3 Drawing Figures

INVENTORS
AKIHIRO WADA
YUICHI SORIMACHI
BY Stevens, Davis, Miller & Mosher
ATTORNEYS

DEVICE FOR REGULATING PRESSURE IN THE INSIDE OF A CAR

This invention relates in general to devices of the inflation type for restraining the occupants of motor vehicles. More Particularly, the invention relates to a device for regulating pressure in the inside of a car or motor vehicle which is effective to automatically control a rise in pressure in the inside of a motor vehicle occasioned by the expansion of air bags therein.

When collision occurs or threaten to occur between motor vehicles or a motor vehicle and obstacles air bags are rapidly inflated. This tends to cause a rise in pressure in the inside of the vehicles. This invention has as its object the provision of a device for regulating pressure in the inside of a car which is designed to open communication between the inside of the car and atmosphere so as to automatically control pressure in the vehicle by releasing an increment in pressure to atmosphere in order to prevent the occupants from suffering secondary injuries due to the inflation of the air bags. The invention is effective to positively provide protection for the occupants against all the types of injuries to which the occupants might otherwise be subjected due to a sudden rise in pressure in the inside of the vehicle occasioned by the inflation of the air bags.

Windows of motor vehicles provided with a device of the inflation type for restraining occupants are generally closed when the cooler or heater is in operation or when the weather is nasty. When a collision takes place and the air bags are rapidly inflated by being filled with gas, such as high pressure gas, pressure in the inside of the vehicle rises suddenly since the vehicle is substantially sealed in airtight, thereby causing the occupants to feel poorly. When the occupants are affected greatly, the ear drum of all or part of them may be ruptured. Thus, the devices of the inflation type for restraining the occupants have a disadvantage in that, although the occupants can be prevented from suffering injuries due to secondary collision by dint of the inflated air bags it is impossible to prevent secondary injuries done to the occupants by a rise in pressure in the inside of the vehicle occasioned by the inflation of the bags.

This invention is effective to positively and safely prevent secondary injuries which the occupants may suffer when a collision takes place. According to the invention, there is provided a device for regulating pressure in the inside of a car comprising unlocking means for positively unlocking the door of the trunk, and communication means for automatically communicating the inside of the car to the inside of the trunk communicable with atmosphere, said unlocking means and said communication means being operatively connected to the occupant restraining device of the inflation type which is also adapted to operate upon actuation of collision sensing means or collision predicting means, whereby secondary injuries which the occupants might otherwise suffer when a collision takes place as aforementioned can be positively prevented.

Additional objects as well as features and advantages of this invention will become evident from the description set forth hereinafter when considered in conjunction with the accompanying drawings, in which.

The embodiment shown and described herein is adapted to effect unlocking of the door of the trunk by a signal produced by the collision predicting means.

Figure 1:
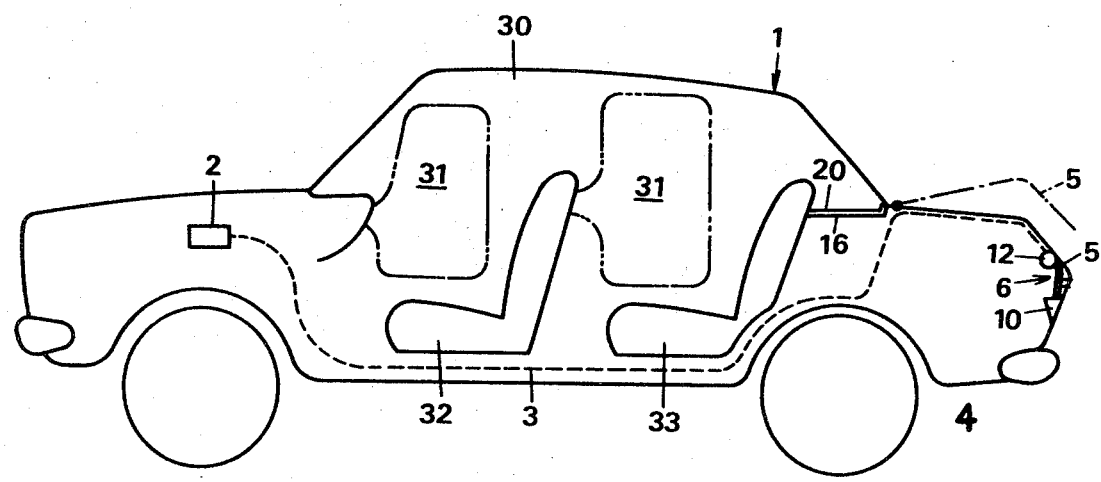
FIG. 1 is a schematic side view of the device according to this invention with the occupant restraining device of the inflation type which shows the manner of operation thereof.

FIG. 1 shows the manner of operation of the device according to this invention. As shown, predicting means 2 for predicting collision is disposed in a suitable position in the engine room of a vehicle 1. A wire 3 connected at one end to the predicting means 2 is connected at the other end to unlocking means 6, such as a solenoid, for example, for electrically unlocking a door 5 of a trunk 4 in the rear of the vehicle 1. 31 refer to air bags mounted in suitable positions in front of a front seat 32 and a rear seat 33. The air bags 31 are shown in double dash-and-dot positions which they occupy when they are expanded.

Figure 2:
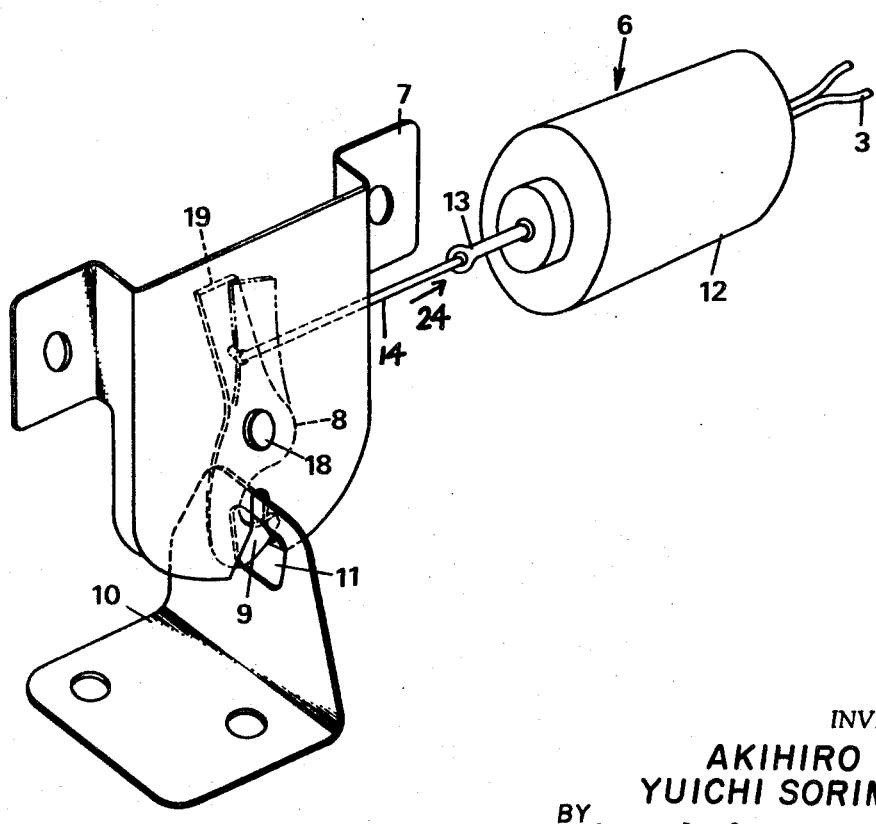
FIG. 2 is a perspective view of the unlocking means for electrically unlocking the door of the trunk.

FIG. 2 shows the unlocking means 6 for the door 5 of the trunk. A lock plate 7 for the door 5 of the trunk, a hook lever 8 pivotally connected at 18 to the central position of the lock plate 7, and a pawl 9 disposed in the lower portion of the lever 8 are formed substantially integrally and disposed in a suitable position on the rear surface of the door 5 of the trunk. The pawl 9 of the hook lever 8 is constructed such that, when the door 5 of the trunk is closed, it is received in an engaging window 11 of a striker 10 secured to the body of the vehicle. The hook lever 8 has an upper end 19 which is connected by a connection rod 14 to an actuator 13 of a solenoid 12 to which are connected the wire 3 connected to the sensing means 2 as aforementioned.

The unlocking means 6 constructed as aforementioned operates such that the solenoid 12 is energized by a signal produced by the collision predicting means 2 and moves the actuator 13 in the direction of an arrow 24. The movement of the actuator 13 moves the hook lever 8 to a double dash-and-dot line position shown in FIG. 2 and at the same time releases the pawl 9 from engagement with the engaging window 11 of the striker 10. As the pawl 9 is released from engagement in the engaging window 11, the door 5 of the trunk is opened as by the biasing force of a spring to a single dash-and-dot line position in FIG. 1.

As aforementioned, the solenoid 12 is energized instantaneously by a collision sensing signal from the predicting means so as to render the various elements of the unlocking means 6 operative immediately before the air bags 31 are expanded by gas, such as high pressure gas, into the double dash-and-dot line positions in FIG. 1. The collision predicting signal supplied from the predicting means 2 to the solenoid 12 is simultaneously forwarded to valve opening means (means for releasing high pressure gas to the gas cylinder, for example) of the occupant restraining device of the inflation type to open the air bags. There is a slight time lag in the inflation of the air bags relative to the actuation of the unlocking means 6 due to a delay in the actuation of the valve opening means and a resistance offered by the line to the flow of gas from the gas cylinder to the air bags. Thus, the unlocking means 6 is effective to open the door 5 of the trunk immediately before the air bags are inflated.

The door 5 of the trunk can be normally opened and closed by usual means.

Figure 3:
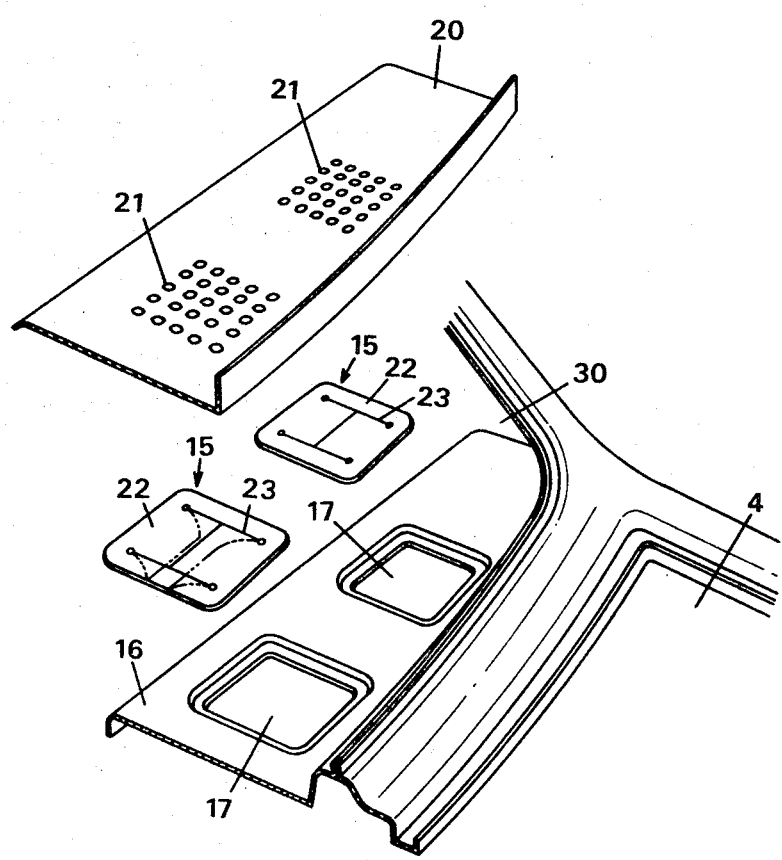
FIG. 3 is an exploded perspective view of portions of the rear seat shelf.

FIG. 3 is an exploded view of communication means 15 provided in a shelf of a rear seat between the rear seat 33 and the trunk 4. A plurality of communication windows 17 of a suitable size are formed in a shalf plate 16 on the body 1 side for communicating the car 30 with the trunk 4 therethrough. An air valve 22 comprising a planar plate of a small thickness made of synthetic rubber, soft synthetic resin or the other similar resilient material and formed therein with a substantially H-shaped breaking portion 23 is provided for each of the communication windows 17. A style strip 20 substantially similar in shape to the shelf plate 16 is secured to the plate 16 by means of an adhesive agent or revets. A multitude of air perforations 21 are formed in the style strip 20 in positions corresponding to the air valves 22.

The communication means 15 constructed as aforementioned operates as follows: The door 5 of the trunk is opened immediately before the air bags 31 are inflated. As the air bags 31 are rapidly opened, the air in the car 30 is introduced through the air perforations 21 in the style strip 20 and opens the air valves 22 as shown in double dash-and-dot line positions in FIG. 3 by its pressure. Thus, the air passes through the air windows 17 to the trunk 4 to be released to atmosphere through the door 5 which is already open. By this arrangement, the air in the car 30 can be maintained in a level substantially similar to the atmospheric pressure.

The unlocking means 6 of the embodiment shown and described herein is described as being actuated by an electric signal from the collision predicting means to carry out an unlocking operation. It is to be understood, however, that this invention is not limited to the specific form of the unlocking means described herein, and that any other means may be used instead. For example, gas, such as high pressure gas, which is used for inflating the air bags may be introduced, through a conduit or the like, to the unlocking means under pressure simultaneously as the air bags are opened so as to effect unlocking by means of an actuator. Alternatively, unlocking may be effected positively and safely by utilizing a sudden decrease in the speed of the vehicle at the time of a collision. For example, it is possible to use mechanically operated collision sensing means including an inertia weight directly mounted on the hook lever 8 of the unlocking means 6 or a link which is adapted to the deformed at the time of a collision and actuate the unlocking means 6 by the deformation caused by the accident.

The device for regulating pressure in the inside of a car according to this invention is constructed and operates as aforementioned. The device is highly effective to actuate, by a signal produced by the collision sensing or predicting means, the unlocking means to unlock and open the door of the trunk of a motor vehicle. Substantially simultaneously as or with a slight time lag relative to the opening of the door of the trunk, the air bags are inflated but an increment in pressure in the inside of the vehicle corresponding to an increase in pressure occasioned by the inflation of the air bags is released to atmosphere through the communication means in the inside of the vehicle and the trunk. This arrangement permits to obviate a sudden rise in pressure in the inside of the vehicle due to the rapid expansion of the air bags by positively and safely releasing an incremental pressure from the inside of the vehicle, thereby eliminating unpleasant feeling which the occupants might otherwise have or injury to the ear drum which the occupants might otherwise suffer when collision takes place and the air bags are rapidly inflated.

The provision of the air valves in the communication means offers an additional advantage of preventing the intrusion of dust or noises from the trunk into the vehicle.

The device according to this invention is very simple in construction, reliable in performance, and low in cost. The device can readily be installed in a motor vehicle which is provided with a conventional occupant restraining device of the inflation type.

What we claim is:

1. In a device for regulating pressure in the inside of the passenger compartment of a car which is equipped with means to produce an electrical signal at least as soon as an accident is imminent and air bags which are inflated in order to restrain the passengers in response to said signal from said means, said passenger compartment being separated by a partition wall from a trunk compartment, the improvement comprising:

a solenoid electrically connected to said means, said solenoid being energized by said signal;

a lock for locking a door of said trunk compartment; and an actuator operatively associated with said solenoid for unlocking said lock;

said partition wall having an aperture for establishing an air path between said passenger compartment and said trunk compartment; said door being normally biased to open position whereby when the lock is unlocked the bias will cause the door to open.

2. The system defined in claim 1, further comprising an air valve of resilient material provided for said aperture, said valve being formed as a plate with a substantially H-shaped breaking portion to open in response to increased air pressure in said passenger compartment.

3. The system defined in claim 2, further comprising a strip superimposed on said partition wall over said air valve, said strip having a plurality of perforations thereon cooperating with said air valve to provide said air path.

* * * * *